(12) United States Patent
Durand

(10) Patent No.: US 8,185,963 B2
(45) Date of Patent: May 22, 2012

(54) PROTECTING LIVE CONTENT IN A NETWORK

(75) Inventor: Alain Durand, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 103 days.

(21) Appl. No.: 12/451,365

(22) PCT Filed: May 6, 2008

(86) PCT No.: PCT/EP2008/055527
§ 371 (c)(1),
(2), (4) Date: Nov. 9, 2009

(87) PCT Pub. No.: WO2008/138804
PCT Pub. Date: Nov. 20, 2008

(65) Prior Publication Data
US 2010/0132051 A1    May 27, 2010

(30) Foreign Application Priority Data

May 11, 2007  (EP) ..................................... 07301033
Aug. 28, 2007  (EP) ..................................... 07115085

(51) Int. Cl.
*H04L 29/06* (2006.01)
(52) U.S. Cl. ............... 726/28; 726/27; 726/29; 709/206
(58) Field of Classification Search .................... 726/28, 726/27, 29; 725/25, 30; 709/206
See application file for complete search history.

(56) References Cited

U.S. PATENT DOCUMENTS

| 2003/0126445 | A1* | 7/2003 | Wehrenberg | 713/176 |
| 2004/0039932 | A1* | 2/2004 | Elazar et al. | 713/200 |
| 2004/0083364 | A1* | 4/2004 | Andreaux et al. | 713/165 |
| 2004/0210926 | A1* | 10/2004 | Francis et al. | 725/25 |
| 2005/0097359 | A1* | 5/2005 | Speare et al. | 713/201 |

(Continued)

FOREIGN PATENT DOCUMENTS

EP    1688944    8/2006
(Continued)

OTHER PUBLICATIONS

Hye Joo Lee et al, Design of Protection and Distribution Service Model for Digital Broadcasting Content, Jun. 27-30, 2004.*

(Continued)

*Primary Examiner* — Jung Kim
*Assistant Examiner* — Shan Elahi
(74) *Attorney, Agent, or Firm* — Myers Wolin, LLC

(57) ABSTRACT

A method for protecting live content in a multimedia system. An Acquisition Point that receives content distributes it in a network comprising a recording device and a rendering device. The content is associated with a license comprising a content identifier and the identity of the sending Acquisition Point. If the content is live, the license indicates that the content is "live protected". A rendering device that receives the content and its license asks the Acquisition Point indicated in the license if it may render the content. If the content is not live, e.g. if it is replayed later, the permission is given. The Acquisition Point also stores a counter that indicates the number simultaneous viewings. If this number equals a maximum number of viewings when a request is received, the Acquisition Point asks all devices if they access the content to check if its count is correct and, if not, permits access to the requesting device.

14 Claims, 2 Drawing Sheets

U.S. PATENT DOCUMENTS

2005/0204132 A1* 9/2005 Diehl et al. .................. 713/168
2006/0080535 A1* 4/2006 Elazar et al. .................. 713/176
2006/0242069 A1* 10/2006 Peterka et al. ................. 705/50

FOREIGN PATENT DOCUMENTS

| EP | 1688944 A1 | * | 8/2006 |
|---|---|---|---|
| WO | WO03021959 A | * | 2/2003 |
| WO | WO 03/021959 | | 3/2003 |

OTHER PUBLICATIONS

Y.Wang et al, Digital Wireless Data Acquisition System for Measurement in High Voltage Substations, Oct. 16, 2004.*
DVB, Digital Video Broadcasting (DVB); Content Protection & Copy Managment, Nov. 2005.*
DVB, Digital Video Broadcast, Nov. 2005.*
Hye Joo Lee et al, Design of Protection and Distribution Service Model for Digital Broadcasting Content, Jun. 2004.*
Y. Wang et al, Digital Wireless Data Acquistion System for Measurement in High Voltage Subtations, Oct. 2006.*
DVB, "Digital Video Broadcasting Content Protection and Copy Management", Nov. 2005.*
Digital Video BroadcastingDVB: "Digital Video Broadcasting (DVB); Content Protection & Copy Management", vol. A094, Nov. 1, 2005, 103 pages; XP007901168.
Search Report Dated November 27, 2008.

* cited by examiner

PROTECTING LIVE CONTENT IN A NETWORK

This application claims the benefit, under 35 U.S.C. §365 of International Application PCT/EP2008/055527, filed May 6, 2008, which was published in accordance with PCT Article 21(2) on Nov. 20, 2008 in English and which claims the benefit of European patent applications No. 07301033.2, filed on May 11, 2007, and 07115085.8, filed on Aug. 28, 2007.

FIELD OF THE INVENTION

The present invention relates generally to digital media systems, and in particular to content protection in digital home networks.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In digital media systems it is sometimes useful to be able to distinguish between live content and recorded content. An exemplary reason for this is that, for example in the requirements defined by the Digital Video Broadcast Copy Protection (DVB) Group, proximity control does not apply to a content forever but will be relaxed when a certain predetermined condition is met. A first possible condition is that proximity control is relaxed as soon as the content is no more live. A second possible condition is that it is relaxed after a fixed amount of time following the live broadcast. A third possible condition is that it is relaxed at a fixed date. It can be seen, however, that the first and the third conditions may be seen as variations on the theme of the second condition: the fixed amount of time is zero for the first condition, and to whatever time it needs to arrive at the date for the third condition. Other exemplary conditions are conditional; proximity control may for example be relaxed if a user has paid extra to access the content, if the user has a certain user profile, or as soon as a certain content is broadcast.

Another example is the limitation of the number of concurrent consumptions of a content. In the DVB group, this limitation is only required for live content and can be relaxed once the content is no longer live.

One method of distinguishing between live and recorded content within a home network is to have the rendering device determine whether the content it is receiving comes from a storage device—recorded content—or from an Acquisition Point, which is the device through which the content enters the home network—live content.

However, a problem may occur when the storage device is capable of so-called trick modes, e.g. replaying live content after a short delay. In this case, the rendering device is led to believe that the content is recorded, while it in fact should be regarded as live content at least for as long as the Acquisition Point is diffusing the content. In this case, trick modes are easy circumvention tools for the proximity control; a user would just have to watch the content with a delay of, say, five seconds to bypass the control.

WO 2006/082130 discloses a solution to the "trick-mode" problem, in which the consumption device broadcasts a message to check whether the content is live or not. If the Acquisition Point answers, content will be considered live, else it will be considered as recorded. A possible circumvention to that solution would be to first record part of the content (e.g. 30 minutes) and then start recording on a second recording device, disconnect the first recording device and the consuming device from the network and play the first part of the content. After 30 minutes, one could disconnect the second recording device and reconnect the first recording device and continue the recording on it. The second recording device would then be used to display the content recorded thereon. As the consuming device is never connected to the Acquisition Point, even using the solution of WO 2006/082130, content would be no more considered as live while a recording device is still recording it.

It can therefore be appreciated that there is a need for a solution that allows a rendering device to distinguish between live content and recorded content, including when trick mode is used or when content is recorded using multiple recording devices. This invention provides such a solution.

SUMMARY OF THE INVENTION

In a first aspect, the invention is directed to an Acquisition Point in a digital network adapted to further comprise a consuming device and a storage device. The Acquisition Point comprises a processor adapted to: broadcast protected content in the network; send to the storage device at least one content license comprising an identifier of the Acquisition Point, a key necessary to access the protected content, and an identifier indicating that the content is subject to particular restrictions for its rendering; receive from the consuming device a request to access the content; and send a response to the consuming device, the response being of a first kind if the Acquisition Point is no more receiving the content and of a second kind if the Acquisition Point is still receiving the content.

In a preferred embodiment, the response of the first kind is a new content license.

In a further preferred embodiment, the response of the second kind is one of a permission to access the content and a denial that does not permit access to the content.

It is advantageous that the Acquisition Point further comprises a memory adapted to store identities of consuming devices to which a permission to access the content has been sent, and that the processor is further adapted to send, if the Acquisition Point is still receiving the content, a permission to access the content if the number of devices to which a permission to access the content has been sent is less than a predetermined number. It is beneficial that the processor, if the number of consuming devices to which a permission has been sent equals a predetermined number, is further adapted to: broadcast a message requiring all consuming devices that access the content to respond; receive responses from consuming devices; and if the number of received responses that indicate that originator of the response accesses the content is less that the predetermined number, send a permission to access the content to the requesting consuming device.

It is also advantageous that the Acquisition Point, if it is still receiving the content, performs a proximity test with the requesting consuming device and sends a permission if the rendering device is local.

In a second aspect, the invention is directed to a consuming device in a digital network. The consuming device comprises a unit for rendering content or exporting content; and a processor adapted to: send a request for a content to a storage device in the digital network; receive from the storage device the content and a corresponding content license comprising an identifier of an Acquisition Point and an indication that the content is subject to particular restrictions for its consuming; send to the Acquisition Point a request to access the content; and consume the content in case the response from the Acquisition Point indicates that consuming is allowed.

In a third aspect, the invention is directed to a method of providing access to content in a digital network comprising an Acquisition Point, a consuming device, and a storage device. The Acquisition Point broadcasts protected content in the network; sends to the storage device at least one content license comprising an identifier of the Acquisition Point, a key necessary to access the protected content, and an identifier indicating that the content is subject to particular restrictions for its consuming; receives from the consuming device a request to access the content; and sends a response to the consuming device, the response being of a first kind if the Acquisition Point is no more receiving the content and of a second kind if the Acquisition Point is still receiving the content.

In a preferred embodiment, the response of the first kind is a new content license.

In a further preferred embodiment, the response of the second kind is one of a permission to access the content and a denial that does not permit access to the content.

It is advantageous that the Acquisition Point further stores identities of consuming devices to which a permission has been sent, the method further comprising the step of sending, if the Acquisition Point is still receiving the content, a permission to access the content if the number of consuming devices to which a permission to access the content has been sent is less than a predetermined number. It is beneficial that, if the number of consuming devices to which a permission to access the content has been sent equals a predetermined number, the Acquisition Point broadcasts a message requiring all consuming devices that access the content to respond; receives responses from consuming devices; and if the number of received responses that indicate that originator of the response accesses the content is less that the predetermined number, sends a permission to access the content to the requesting device.

In a further preferred embodiment, if the Acquisition Point is still receiving the content, it performs a proximity test with the requesting consuming device and sends a permission to access the content if the consuming device is local.

In a fourth aspect, the invention is directed to a method of consuming content in a digital network. A consuming device sends a request for a content to a storage device in the digital network; receives from the storage device the content and a corresponding content license comprising an identifier of an Acquisition Point and an indication that the content is subject to particular restrictions for its consuming; sends to the Acquisition Point a request to access the content; and consumes the content in case the response from the Acquisition Point indicates that consuming is allowed.

BRIEF DESCRIPTION OF THE DRAWINGS

Preferred features of the present invention will now be described, by way of example, with reference to the accompanying drawings, in which.

PREFERRED EMBODIMENT OF THE INVENTION

Figure 1:
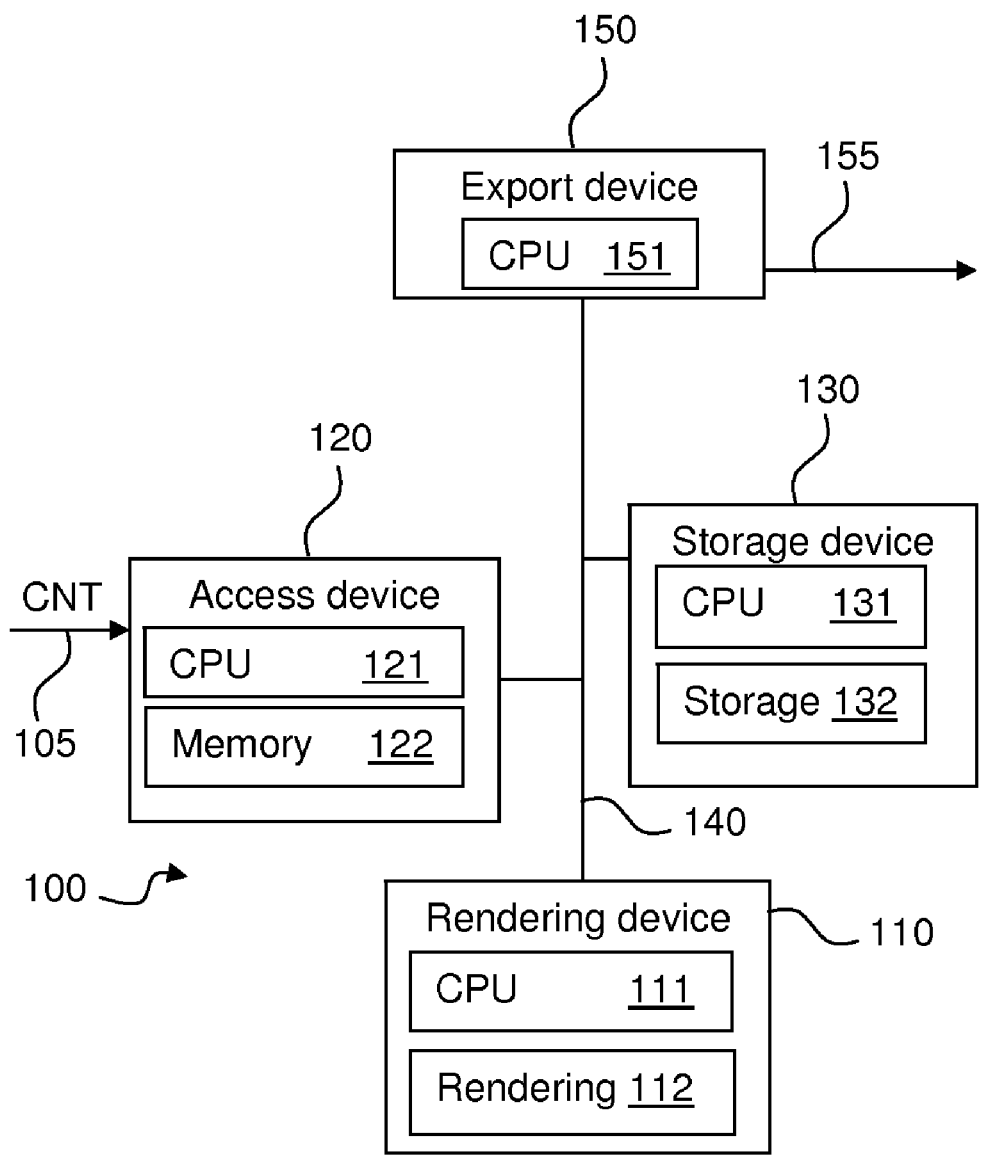
FIG. 1 illustrates an exemplary digital network in which the invention is used.

FIG. 1 illustrates an exemplary digital network 100 (also called system), advantageously for use in a user's home, in which the invention is used. The network 100 comprises a rendering device (RD) 110, an Acquisition Point (AP) 120 (also called access device), and a storage device (SD) 130, connected through an exemplary connection 140, such as for example an Ethernet connection. The rendering device 110, the Acquisition Point 120, and the storage device 130 each comprise a processor 111, 121, 131 for receiving and sending messages. The rendering device 110 further comprises a unit 112 for rendering content, such as for example a display, and the storage device 130 further comprises a storage medium 132 for storing content. The network 100 further comprises an export point 150, having a processor 151, the export point being adapted to export content to another network (not shown) over a second connection 155. In the description and in the claims, the term "consuming device" may be employed as a generic expression for a rendering device and an export point.

Simplifying somewhat, the network 100 normally works as follows: the Acquisition Point 120 receives digital content CNT over a third connection 105, protects the content by scrambling it using a scrambling key, creates a corresponding content license comprising the scrambling key for the content, and broadcasts the content over the network 100 to the storage device 130, the export point 150, and the rendering device 110 where it may be made available to the user. It should be noted that the network 100 could comprise further rendering devices, recording devices and export points, but these are not shown in FIG. 1 for the sake of clarity.

When it is desired that the content CNT is only to be viewed "live," i.e. while the content is still being received from e.g. a content provider by the Acquisition Point 120 and delivered over the network 140, and that it should not be possible to overcome this limitation by using "trick play", it is preferred that the content license that accompanies the content is marked accordingly, so that the Acquisition Point 120 may recognize such content, and also that it comprises a content identifier that may be received by the Acquisition Point 120 or, alternatively, may be generated by the Acquisition Point 120. The Acquisition Point 120 also marks the content license with its own identity. The Acquisition Point 120 may still deliver the content CNT to any number of rendering devices and recording devices, but the content is protected and a corresponding content license is needed for these devices to access the content properly, e.g. to play it. Such a content license, indicating that the content CNT is "live protected," i.e. subject to particular restrictions for its rendering, is delivered to each storage device. The Acquisition Point 120 preferably keeps a list of devices to which the content access is delivered in a memory 122, the list preferably also indicating for each device if a permission to access the content CNT has been delivered to it. The permission advantageously takes the form of a, if necessary new, content license. As will be seen hereinafter, a rendering device or an export device may request a permission.

In a preferred embodiment, when the content CNT is "live", i.e. broadcast in the network 100 by the Acquisition Point 120, the Acquisition Point 120 may limit the number of permissions delivered to consuming devices. In other words, the number of simultaneous viewings is limited. The permissions so delivered preferably indicate that the content is "live protected". The limitation as to the permissions may either be received by the Acquisition Point 120 together with or separate from the content, but the Acquisition Point 120 may also have pre-stored limitations, e.g. for certain kinds of content, content broadcast during specific time intervals, a generic limitation, or a combination that preferably limits the number of simultaneous viewings to the lowest of at least two values.

When the content CNT is over, i.e. when content bearing the corresponding content identifier (or indicated in any other suitable manner) no longer is received by the Acquisition Point 120, it delivers content licenses that do not enforce "live protection" to each storage device to which it according to the list 122 has delivered the content CNT. Each storage device may then use the content or deliver it to rendering devices that will be able to access it without requesting any further permission.

As a user may instruct a rendering device 110 or an export point 150 to render or export the content CNT at any time, e.g. if the user changes location to access the content via another rendering device, such a device should in response request a permission from the Acquisition Point 120.

Upon reception of such a request, the Acquisition Point 120 may react in a number of different ways.

If the content is over and/or should not be "live protected", the Acquisition Point 120 delivers a content license that does not enforce "live protection" to the requesting device. This may for example occur if the rendering device 110 received the content CNT and the corresponding license from the recording device 130 not using "trick play".

If the content CNT is still broadcast by the Acquisition Point 120 and the request comes from a recording device, then the request is denied and an error is returned.

If the content CNT is still broadcast by the Acquisition Point 120 and the maximum number of permissions (not counting to recording devices) has not been delivered, then the Acquisition Point 120 delivers the permission enforcing "live protection" to the requesting device and adds the identity of the requesting device to the list in the memory 122 together with a mention that a permission has been delivered to it. It should be noted that it is also possible that the content CNT has been delivered to the device (in which case it is on the list), but that no permission has been delivered to it; in this case, the list is updated accordingly.

However, if the content CNT is still broadcast by the Acquisition Point 120 and the maximum number of permissions (not counting to recording devices) has been delivered, then the Acquisition Point 120 preferably sends a message to each consuming device in the list to which a permission was delivered, inquiring whether or not the device is still accessing the content identified in the message. Each device that either renders or exports the content is bound to respond in the positive, while it is preferred that no such obligation exists in the opposite case. If each device returns a positive response, then the request is refused. On the other hand, if at least one device does not respond or returns a negative response, then permission may be granted. To achieve this, the Acquisition Point 120 advantageously picks a new scrambling key, preferably at random, which it uses to protect the content CNT. The scrambling key is included in a new content license that is sent as a permission to all the devices that returned a positive response and to the requesting device. The list is updated accordingly.

According to a preferred embodiment, if the Acquisition Point 120 is still receiving the content, it performs a proximity test with the requesting consuming device and grants the permission only if the rendering device is local, i.e. considered to be close. The test may be performed using any suitable method in the art, such as for example measuring the return trip time of a message.

Figure 2:
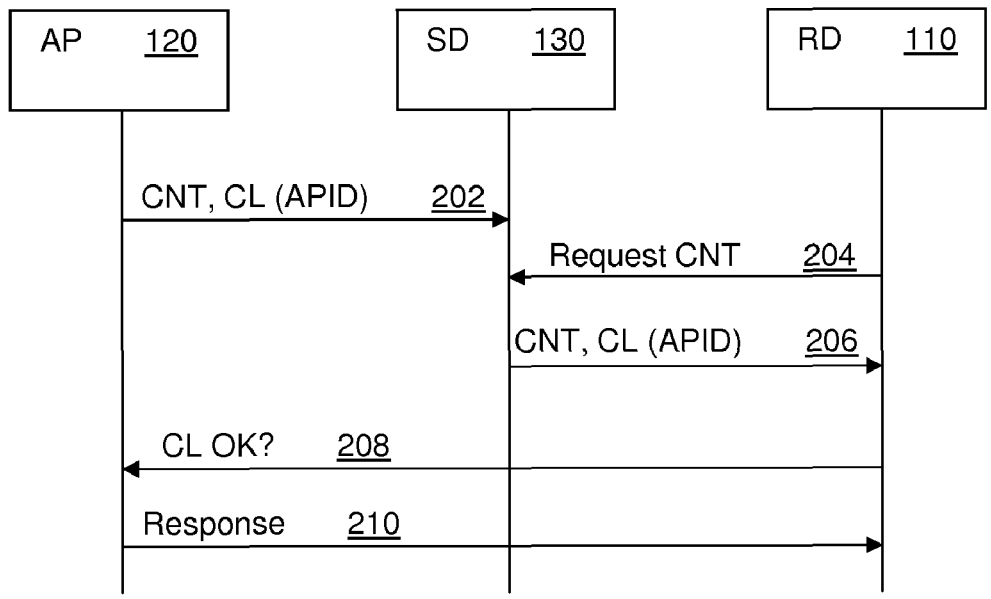
FIG. 2 illustrates a signal flow diagram of a preferred embodiment of the method according to the invention.

FIG. 2 illustrates a signal flow diagram of a preferred embodiment of the method according to the invention. In step 202, an Acquisition Point (AP) 120 delivers to a storage device (SD) 130 content CNT and the corresponding content license CL that comprises an identifier of the Acquisition Point (APID). The content license CL indicates that the content is "live protected". The storage device 130 stores the received content CNT and the content license CL.

A rendering device (RD) 110 sends 204 a request for the content CNT to the recording device 130 that returns 206 the content CNT and the requisite license CL (comprising the Acquisition Point identifier) to the requesting rendering device 110. Upon reception of the content CNT and the license CL, the rendering device 110 checks if the content CNT is "live protected" (which it is) and therefore uses the Acquisition Point identifier APID in the content license CL to send 208 a request to the Acquisition Point 120.

How the Acquisition Point 120 responds 210 depends on the situation, as detailed hereinbefore. For example, if the content is live and the maximum number of viewings is not reached, the Acquisition Point 120 permits viewing by the rendering device 110.

Figure 3:
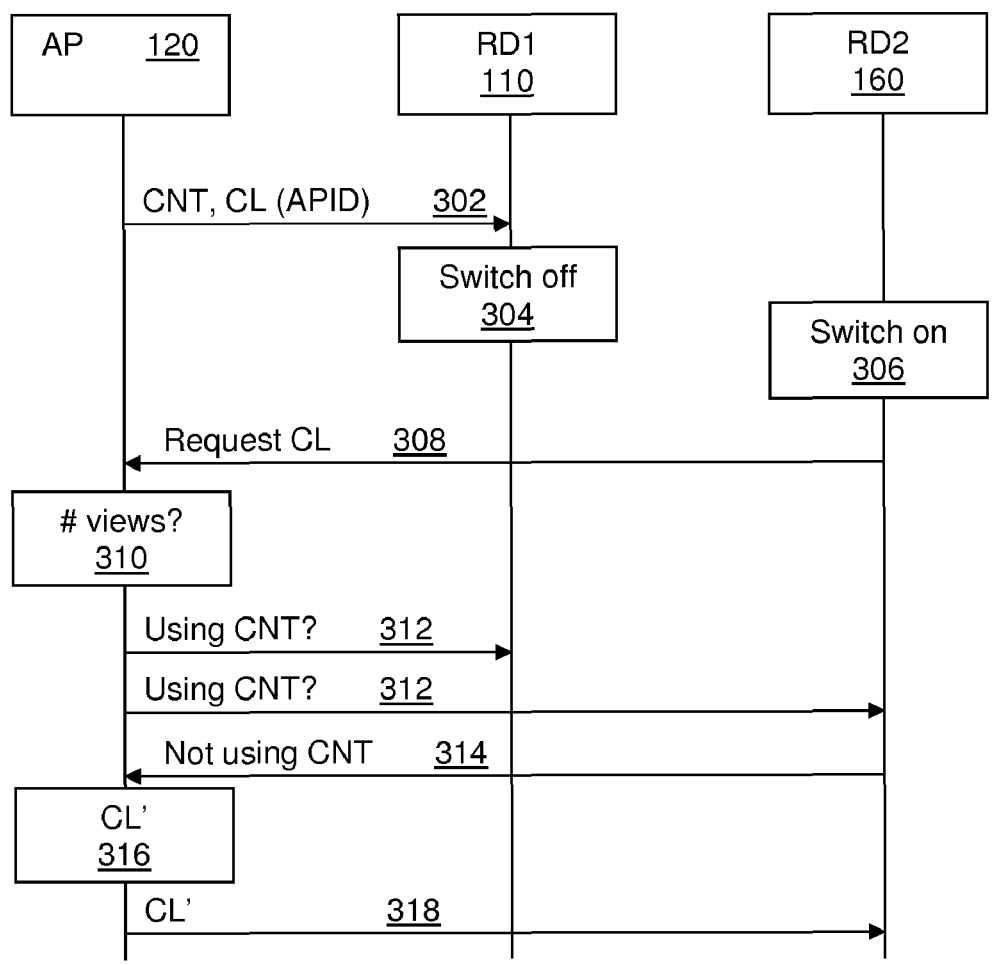
FIG. 3 illustrates a signal flow diagram of a further preferred embodiment of the method according to the invention.

FIG. 3 illustrates a signal flow diagram of a further preferred embodiment of the method according to the invention. In step 302, the Acquisition Point 120 delivers the content CNT and the corresponding license CL comprising the Acquisition Point ID (APID) to a first rendering device 110.

The user then switches off 304 the first rendering device and switches on 306 a second rendering device 160 that requests 308 a content license CL from the broadcasting device, i.e. the Acquisition Point 120. The Acquisition Point 120 then verifies 310 if the maximum number of simultaneous views is reached, which it in this example will be assumed is the case (let's say that it is equal to 1), as the Acquisition Point 120 has listed that it has sent a content license for the content to the first rendering device 110.

The Acquisition Point 120 then broadcasts 312 a message that requires all devices that are using the content (identified by a content identifier) to respond. As the first rendering device 110 has been switched off, it does not respond at all. It should be noted that in case the first rendering device 110 had been switched to access another content, it may respond in the negative, but it is also possible for it not to respond at all. As the second rendering device does not (yet) access the content, it responds 314 in the negative, or not at all.

After a short interval intended to give the devices time to respond, the Acquisition Point 120 analyses the responses. In the present example, it has received no positive response and may thus create 314 a new content license CL' (comprising a new scrambling key that is used to scramble the content) that it sends 316 to the second rendering device 160 that then may access the content CNT. The Acquisition Point 120 also updates its list of devices to which a present content license has been delivered.

It can thus be appreciated that the present invention provides a way to protect live content that should only be accessed live from being accessed through the use of e.g. trick play.

It will be understood that it is possible for one physical device to accommodate the functions of more than one device described hereinbefore. For example, an Acquisition Point and a storage device may be co-located in a device. In such a case, "Acquisition Point" refers to the part handling Acquisition Point functions in the multifunction device and so on. In some cases, simplifications may be possible: e.g. a device that combines functionalities of an Acquisition Point and a storage device will if possible never answer twice but only provide one relevant answer.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. An Acquisition Point in a digital network that comprises a consuming device and a storage device, the Acquisition Point comprising a processor for:
   broadcasting protected content in the network;
   sending to the storage device at least one content license comprising an identifier of the Acquisition Point, a key necessary to access the protected content, and an identifier indicating that the content is subject to particular restrictions for its rendering;
   receiving from the consuming device a request to access the content received from the storage device; and
   sending a response to the consuming device indicating whether access to the content is allowed, the response being of a first kind if the Acquisition Point is no longer receiving the content and of a second kind if the Acquisition Point is still receiving the content.

2. The Acquisition Point of claim 1, wherein the response of the first kind is a new content license.

3. The Acquisition Point of claim 1, wherein the response of the second kind is one of a permission to access the content and a denial that does not permit access to the content.

4. The Acquisition Point of claim 3, further comprising a memory for storing identities of consuming devices to which a permission to access the content has been sent, and wherein the processor is further for sending, if the Acquisition Point is still receiving the content, a permission to access the content if the number of devices to which a permission to access the content has been sent is less than a predetermined number.

5. The Acquisition Point of claim 4, wherein the processor, if the number of consuming devices to which a permission has been sent equals a predetermined number, is further for:
   broadcasting a message requiring all consuming devices that access the content to respond;
   receiving responses from consuming devices; and
   if the number of received responses that indicate that originator of the response accesses the content is less that the predetermined number, sending a permission to access the content to the requesting consuming device.

6. The Acquisition Point of claim 3, further comprising:
   if the Acquisition Point is still receiving the content, the processor is further for performing a proximity test with the requesting consuming device and sending a permission if the rendering device is local.

7. A consuming device in a digital network, the consuming device comprising:
   a unit for rendering content or exporting content; and
   a processor for:
      sending a request for a content to a storage device in the digital network;
      receiving from the storage device the content and a corresponding content license comprising an identifier of an Acquisition Point and an indication that the content is subject to particular restrictions for its consuming;
      sending to the Acquisition Point a request to access the content received from the storage device; and
      consuming the content in case the response from the Acquisition Point indicates that consuming is allowed;
   wherein the response is being of a first kind if the Acquisition Point is no longer receiving the content and of a second kind if the Acquisition Point is still receiving the content.

8. A method of providing access to content in a digital network comprising an Acquisition Point, a consuming device, and a storage device, the method comprising, in the Acquisition Point:
   broadcasting protected content in the network;
   sending to the storage device at least one content license comprising an identifier of the Acquisition Point, a key necessary to access the protected content, and an identifier indicating that the content is subject to particular restrictions for its consuming;
   receiving from the consuming device a request to access the content received from the storage device; and
   sending a response to the consuming device indicating whether access to the content is allowed, the response being of a first kind if the Acquisition Point is no longer receiving the content and of a second kind if the Acquisition Point is still receiving the content.

9. The method of claim 8, wherein the response of the first kind is a new content license.

10. The method of claim 8, wherein the response of the second kind is one of a permission to access the content and a denial that does not permit access to the content.

11. The method of claim 10, wherein the Acquisition Point further stores identities of consuming devices to which a permission has been sent, the method further comprising sending, if the Acquisition Point is still receiving the content, a permission to access the content if the number of consuming devices to which a permission to access the content has been sent is less than a predetermined number.

12. The method of claim 11, further comprising, if the number of consuming devices to which a permission to access the content has been sent equals a predetermined number:
   broadcasting a message requiring all consuming devices that access the content to respond;
   receiving responses from consuming devices; and
   if the number of received responses that indicate that originator of the response accesses the content is less that the predetermined number, sending a permission to access the content to the requesting device.

13. The method of claim 10, further comprising:
   if the Acquisition Point is still receiving the content, performing a proximity test with the requesting consuming device and sending a permission to access the content if the consuming device is local.

14. A method of consuming content comprising, in a consuming device in a digital network:
   sending a request for a content to a storage device in the digital network;
   receiving from the storage device the content and a corresponding content license comprising an identifier of an Acquisition Point and an indication that the content is subject to particular restrictions for its consuming;
   sending to the Acquisition Point a request to access the content received from the storage device; and
   consuming the content in case the response from the Acquisition Point indicates that consuming is allowed;
   wherein the response is being of a first kind if the Acquisition Point is no longer receiving the content and of a second kind if the Acquisition Point is still receiving the content.

* * * * *